Inventor
Albert C Fischer
By Albert F Robinson
Atty

Patented Apr. 28, 1931

1,803,179

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

RAIL FILLER

Original application filed July 13, 1927, Serial No. 205,518. Patent No. 1,730,068, dated October 1, 1929. Divided and this application filed August 26, 1929. Serial No. 388,458.

The present invention relates to an improved rail filler formed from a mixed mass of earthy material in which relatively long strands of animal fibre may be incorporated for reenforcing the structure.

This case is a division of application Serial No. 205,518 filed July 13, 1927, and issued October 1, 1929, as Patent No. 1,730,068.

For a better understanding of the invention, reference may be had to the accompanying drawing, in which—

Figure 1:
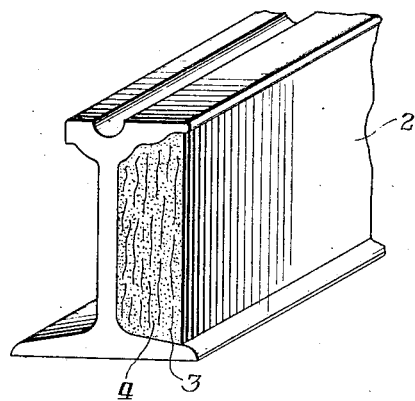
Fig. 1 is a perspective view of a rail section embodying the invention.
Figure 2:
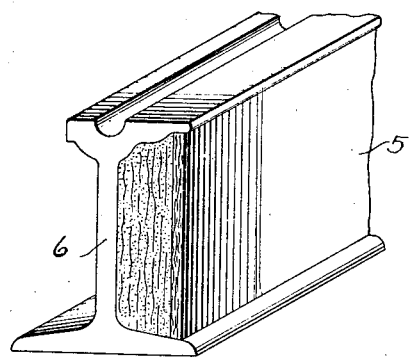
Fig. 2 is a perspective view of a rail section embodying a modified form of the invention.

Referring to these drawings, the invention is typified by a rail filler 2 composed of a mass of earthy material 3, such as clay, shales, infusorial earth, or fuller's earth, and oil. The oil is preferably included in such proportion as to make the earthy material ductile and workable, and may be represented by such oils as cotton seed oil, castor oil, fish oils or the like. Slow-drying or non-drying oils are preferred.

A suitable mixture for rail filler purposes is typified by a mass comprising approximately seventy-five (75) per cent clay, preferably in a ground, pulverized state, and approximately twenty-five (25) per cent oil. A relatively stiffer material can be produced by increasing the proportion of the earthy material content and decreasing the oil content. The proportion of earthy material may be from seventy-five (75) to ninety-five (95) per cent, and that of the oil from twenty-five (25) to five (5) per cent.

In order to reenforce the previously described mass, and provide expansive and insulating characteristics, relatively long strands of animal hair 4 or the like, are incorporated. These strands interlace and bond the mass into strong reenforced structure.

After a thorough mixing of the ingredients of the mass, the mixture is formed into strips of desired contour by suitable forming means.

One or both sides of the rail filler may be coated with a layer of waterproofing material 5, such as a bituminous compound. Such a coating provides means for securing the rail filler in the cavity of rail 6. This waterproofing coating may also be in the form of asphalt saturated felt sheets, which also function to reenforce the rail filler.

While I have shown and described specific embodiments typifying the invention, it will be understood that they are for the purpose of illustration and do not limit the invention. Various changes may be made without departing from the spirit of the invention.

I claim:

1. A preformed rail filler comprising an earthy composition reenforced with relatively long strands of animal hair.

2. A rail filler comprising a composition strip of earthy material, oil, and animal hair.

3. A rail filler comprising a composition strip of earthy material, a non-drying oil, and animal hair.

4. A preformed rail filler comprising a composition strip having a predominant proportion of earthy material and a subordinate proportion of animal hair.

5. A rail filler comprising a composition body of earthy material and animal hair, and a waterproofing layer applied to the face of the body.

6. A rail filler comprising a composition body of earthy material and animal hair, and a bituminous saturated felt applied to the face of the body.

7. A rail filler comprising a composition body of earthy material, oil, and animal hair, and a waterproofing layer applied to the face of the body.

8. A rail filler comprising a composition strip of clay and animal hair.

9. A rail filler comprising a composition body of clay and animal hair, and a waterproofing layer applied to the face of the body.

10. A rail filler comprising a composition body of clay and animal hair, and a bituminous saturated felt layer applied to the face of the body.

Signed at Chicago, in the county of Cook and State of Illinois, this 24th day of August, 1929.

ALBERT C. FISCHER.